United States Patent [19]

Gommier et al.

[11] Patent Number: 4,708,898

[45] Date of Patent: Nov. 24, 1987

[54] SEALING STRIPS

[75] Inventors: Hervé Gommier, Illiers; Jean-Michel Lamblin, Gellainville, both of France

[73] Assignee: Draftex Industries Limited, Edinburgh, Scotland

[21] Appl. No.: 841,627

[22] Filed: Mar. 20, 1986

[30] Foreign Application Priority Data

Mar. 21, 1985 [GB] United Kingdom ................. 8507301
Mar. 23, 1985 [GB] United Kingdom ................. 8507616

[51] Int. Cl.⁴ .............................................. E06B 7/16
[52] U.S. Cl. ..................................... 428/36; 428/192; 428/122; 49/490; 49/491; 49/497; 49/498; 52/716
[58] Field of Search ................. 428/36, 122, 192, 188; 49/490, 491, 497, 498; 52/716

[56] References Cited

U.S. PATENT DOCUMENTS 4,052,522 10/1977 Narita ............................ 428/174 X
4,374,880 2/1983 Mesnel ............................ 428/122 X
4,455,785 6/1984 Wahr et al. .

FOREIGN PATENT DOCUMENTS 898009 6/1962 United Kingdom .
1014469 12/1965 United Kingdom .
1488272 10/1977 United Kingdom .
2062733 5/1981 United Kingdom .

Primary Examiner—Alexander S. Thomas
Attorney, Agent, or Firm—Leydig, Voit & Mayer

[57] ABSTRACT

A sealing strip has a channel-shaped gripping section for mounting on a flanged joint running around an opening such as an opening in a vehicle body, and a hollow tubular soft sealing section is attached to and runs alongside the gripping section. In order to prevent distortion of the sealing section at a sharp bend, a rigid support member, such as made of ABS plastics material, is fixed within the gripping section and has a part which is in contact with the outside surface of the sealing section at the bend and is adhesively secured to it.

5 Claims, 6 Drawing Figures

SEALING STRIPS

BACKGROUND OF THE INVENTION

The invention relates to sealing strips such as for sealing around closable openings, door openings in vehicle bodies for example.

Sealing strips are known which include a length of relatively soft hollow tubular material which in use may be supported around the periphery of a closable opening for the purposes of providing a seal when the opening is closed by a closure member, such as a door. A problem which can occur with such hollow sealing members is that they may partially collapse where they follow a very sharp bend in the periphery. It is this problem with which the invention is concerned.

SUMMARY OF THE INVENTION

According to the invention, there is provided in or for a sealing strip having longitudinally extending flexible sealing means, a stiff support member configured to match the curvature of a sharp bend in the sealing means, the support member being adapted to be secured to the sealing means on the outside of the bend so as substantially to prevent distortion of the sealing means at the bend.

According to the invention, there is also provided in or for a sealing strip having longitudinally extending flexible sealing means mounted on an outside surface of channel-shaped longitudinally extending gripping means which is adapted to embrace and grip a mounting flange or the like running along the periphery of an opening to be sealed, a sealing member made of stiff material and configured to match the curvature of a bend in the sealing strip, part of the support member being adapted to be received in and held by the gripping means and another part of the support member being in contact with a surface of the sealing means on the outside of the bend and adhesively secured to that surface whereby substantially to prevent distortion of the sealing means.

According to the invention, there is further provided a sealing strip, comprising longitudinally extending flexible sealing means curved to match a bend of small radius, and a stiff support member positioned at the apex of the bend and configured to match the radius there and in contact with and secured to a surface of the sealing means there on the outside of the bend, whereby substantially to prevent distortion of sealing means at the bend.

According to the invention, there is yet further provided a method of minimising distortion in a sealing strip having longitudinally extending flexible sealing means which in cross-section wholly or partially embraces a hollow interior, comprising the step of rigidly supporting the sealing means on the outside of a sharp bend in the sealing strip in a manner such as to prevent movement of the sealing means towards the centre of curvature of the bend or corner, whereby to minimise distortion of the sealing means there.

DESCRIPTION OF PREFERRED EMBODIMENTS

A sealing strip embodying the invention for sealing around a door opening in a vehicle body will now be described, by way of example only, with reference to the accompanying diagrammatic drawings in which.

Figure 1:
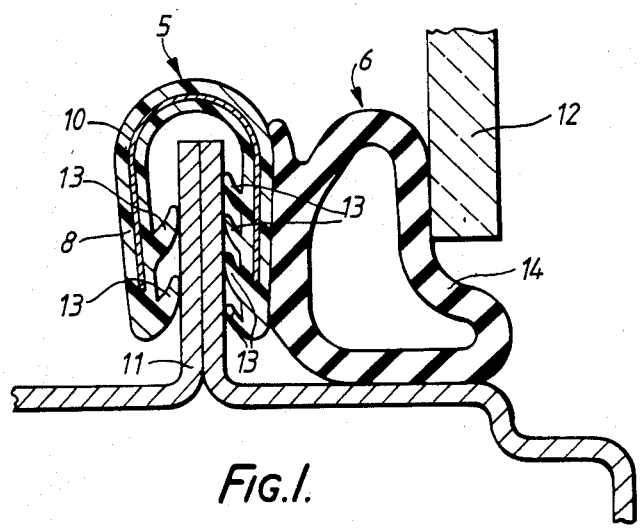
FIG. 1 is a section through a length of sealing strip of known form on a line II—II of FIG. 2.

As shown in FIG. 1, a known form of sealing strip comprises a channel-shaped gripping section 5 and a hollow tubular sealing section 6. The gripping section 5 is in the form of channel-shaped rubber or plastics material 8 in which is embedded a generally channel-shaped reinforcing metal carrier 10. In use, the gripping section 5 embraces a flanged joint 11 running around the periphery of the door opening, so as to support the sealing section in such a position that the vehicle door 12 closes onto it so as to form a seal around the opening.

The metal carrier 10 may take any suitable form. For example, it may comprises a series of U-shaped elements either connected together by short connecting links or disconnected from each other. Instead, it may comprise wire looped to and fro. In each case, it is designed to be relatively flexible, so as not significantly to impede bending of the gripping section 5 but also to be relatively resilient so as to assist the gripping section 5 in gripping the flanged joint 11. The grip of the gripping section 5 on the flanged joint 11 is enhanced by the provision of gripping lips 13 which are extruded integrally with the material 8. As shown in this example, there are two relatively large gripping lips on one side of the channel and four relatively smaller gripping lips on the other side. However, there may be greater or lesser numbers of gripping lips. The extrusion process may be arranged so that the material forming the gripping lips 13 has a hardness which is different from that of the channel-shaped material 8. Advantageously, the gripping lips are made of softer material than the material 8.

The material 8 may be arranged to have sponge consistency to increase its softness and improve its appearance.

The sealing section 6 is made of soft resilient material of hollow tubular form 14, advantageously being of sponge rubber. In this example, the tubular part 14 is adhesively secured along one outside side wall of the gripping section 5. Other configurations for the sealing section 6 are possible. It is also possible to extrude the material of the sealing section 6 integrally with the material 8 (and the material of the gripping lips 13).

Figure 2:
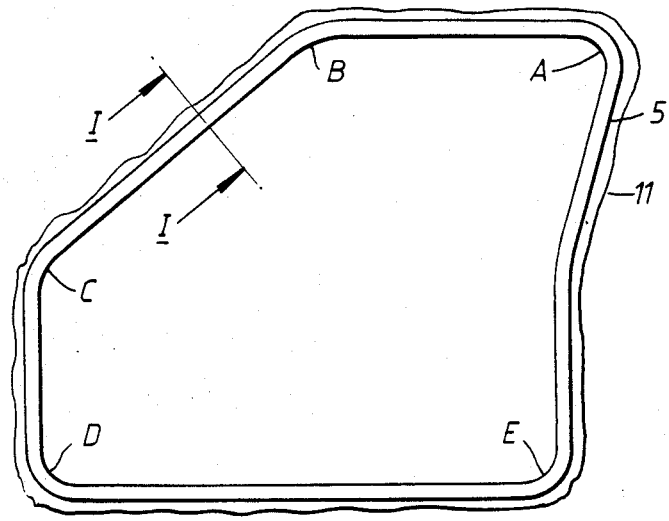
FIG. 2 is a diagrammatic view of the door opening showing the sealing strip in position.

The door opening is shown diagrammatically in FIG. 2 with the sealing strip fitted to it (the sealing section 6 is on the reverse side of the opening to that shown in FIG. 2). As shown, the opening has bends A to E. Obviously the seal provided by the sealing strip must be continued around such bends or corners. In cases where there is an actual corner to be sealed, two separate lengths of the sealing strip may be mitred and joined together by a welding process, possibly also involving the moulding on of a specially shaped corner piece. Often, however, the door opening is like the one illustrated in FIG. 2 and includes a very sharp bend (as at A)—as opposed to a corner, and a mitred joint of this form is not possible.

Figure 3:
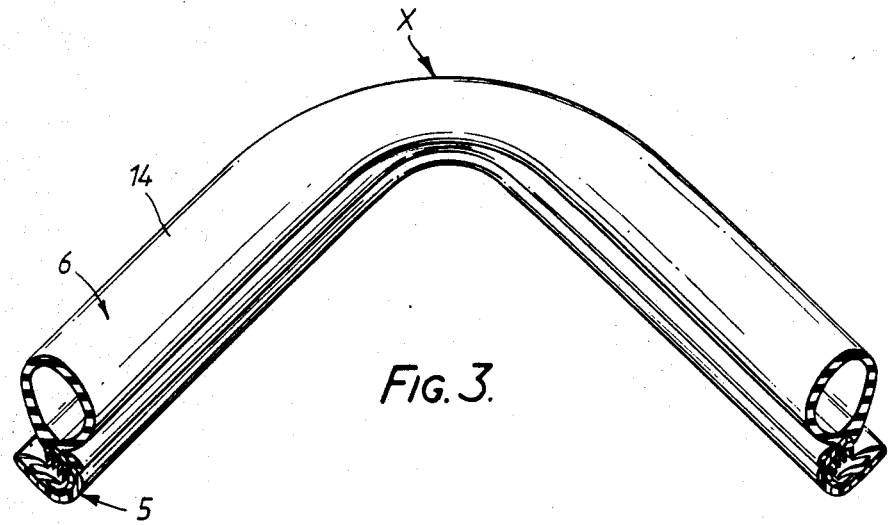
FIG. 3 shows a length of the known sealing strip of FIG. 1, bent to follow a very sharp bend.

FIG. 3 shows a sealing strip of the form shown in FIG. 1 bent to follow such a very sharp bend as is shown at A in FIG. 2. As is apparent at X in FIG. 3, the effect of the very sharp bend is to cause the hollow sealing section 6 partially to collapse at the bend. In other words, the sealing section 6 attempts to bridge across the bend. The sealing section 6 is thus very significantly distorted at the bend, giving an unsightly appearance. Moreover, the distortion may cause the sealing section 6 to move away from its intended peripheral path to such an extent as to impair the sealing action at the bend.

Figure 4:
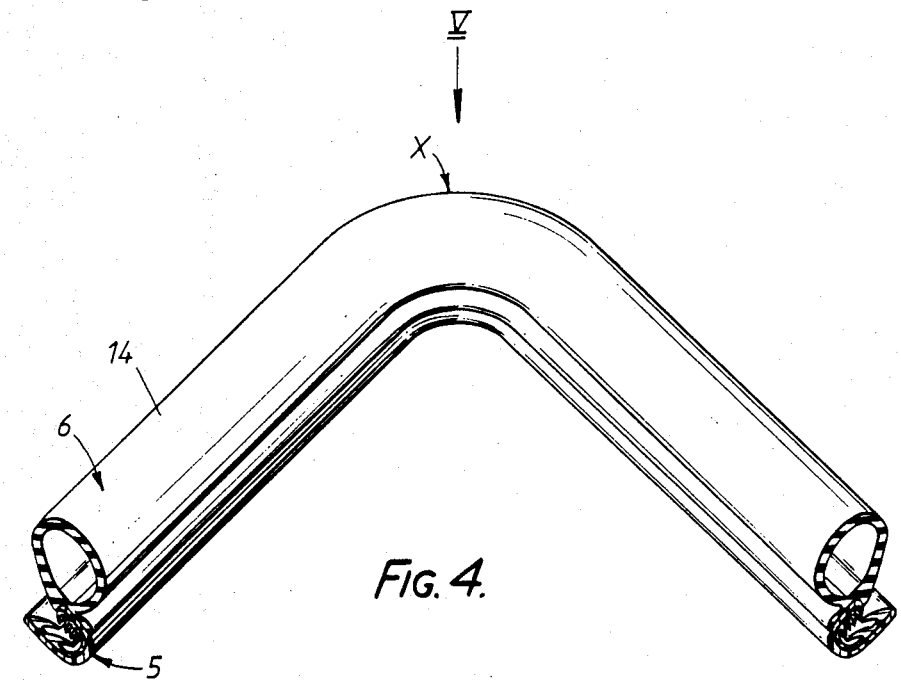
FIG. 4 shows a view corresponding to FIG. 2 but showing a sealing strip embodying the invention.
Figure 5:
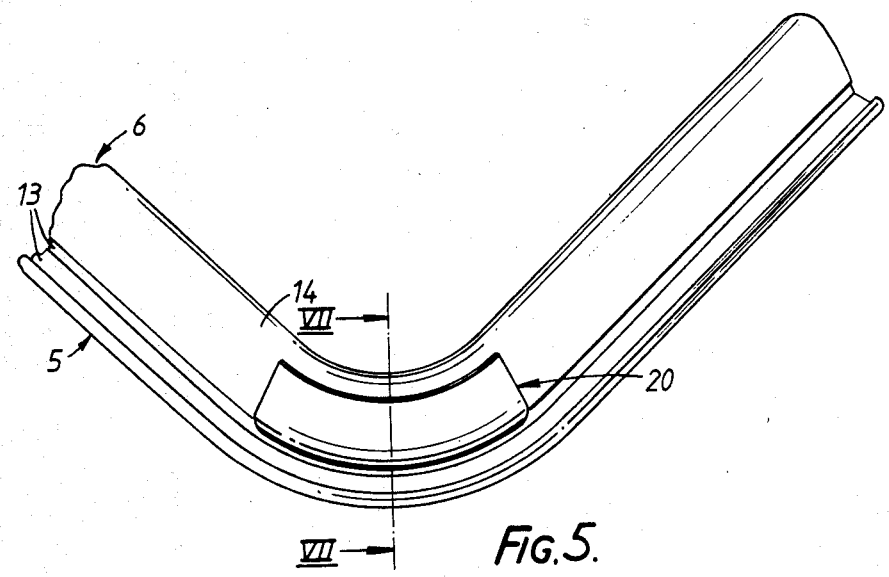
FIG. 5 is a view looking in the direction of the arrow IV of FIG. 4.
Figure 6:
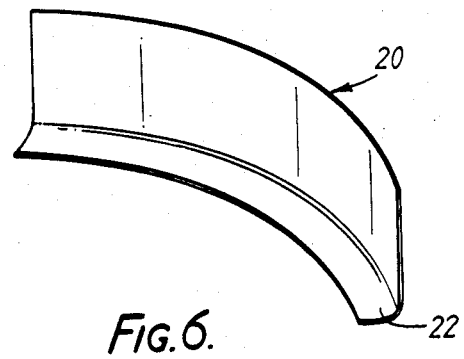
FIG. 6 is a perspective view of part of the sealing strip of FIGS. 4 and 5.

FIG. 4 corresponds to FIG. 3 but shows the configuration which a sealing strip embodying the invention would have at the same bend A shown in FIG. 2. As is apparent from FIG. 4, there is substantially no distortion. In order to achieve this, and as shown in FIG. 5, a support member 20 is provided which is made of rigid material such as ABS plastics material or metal. The support member 20 is pre-formed so as to follow the required radius of curvature of the bend. As is shown particularly in FIG. 6, it has a base part 22 which extends into the channel of the gripping section 5 at the sharp bend. This part 22 of the support member 20 is, however, sufficiently thin so as still to permit the flanged joint 11 (FIG. 1) to be embraced by the gripping section 5 at the bend. The remaining part of the support member 20 is substantially at right angles to the base part 22 and is positioned so as to be in contact with the surface of the tubular sealing part 14 on the outside of the sharp bend. Where it is in such contact, it is adhesively secured to the sealing section 6 by a suitable adhesive. The effect of this is that the rigid support member 20 ensures that the outside surface of the tubular sealing part 14 correctly follows the radius of the bend, and therefore the remainder of the sealing section 6 also correctly follows the radius of the bend. Substantially no distortion of the sealing section therefore takes place at the bend.

It will be appreciated that, with the sealing strip mounted in position on the vehicle body, viewing in the direction of the arrow V of FIG. 4 is not normally possible because the view in this direction would be obscured by the vehicle trim. Therefore, the support member 60 is normally substantially wholly invisible. Its distal edge may be visible and in that case is advantageously coloured so as to match the colour of the sealing section 6 so as to minimise its visibility.

The base part 22 of the support member 20 may be provided with a shoulder which clips under one of the gripping lips 13.

If necessary, part of the sealing section 6 may be cut away to accommodate the support member 20.

Sealing strips embodying the invention may be bent round bends having radius of the order of 25 millimeters or less without significant distortion of their sealing sections.

It will be appreciated that many modifications may be made without departing from the scope of the invention.

In one such modification, the support member 20 may be used to prevent distortion of other forms of sealing 6 such as sealing sections not having closed tubular form but being in the form of curved leaves.

Furthermore, the support members may be used to prevent distortion of sealing sections 6 which are not attached to gripping sections. For example, the invention may be applied to boot seals and bonnet seals on vehicle bodies. It is also pointed out that the invention may be applied to seals manufactured by duplex extrusion, that is, seals in which the sealing section 6 is integrally extruded with the flexible material 8 of the gripping section 5, with each part of the extruded material having the appropriate consistency or degree of hardness. However, these are merely examples and are not intended to limit the general applicability of the invention.

What is claimed is:

1. A sealing strip comprising
longitudinally extending flexible sealing means curved to match a bend of small radius,
longitudinally extending gripping means in the form of channel-shaped longitudinally extending material on the outside of which the sealing means is mounted and supported, the gripping means embracing and gripping a mounting flange or the like running along at least part of the periphery of an opening to be sealed by the sealing strip,
a stiff support member positioned at the apex of the bend and configured to match the radius there and in contact with and secured to a surface of the sealing means on the outside of the bend, whereby substantially to prevent distortion of the sealing means at the bend, the support member having a part which is held in the channel of and gripped by the gripping means so as to support the support member.

2. A sealing strip according to claim 1, in which the sealing means comprises soft flexible material of hollow tubular form.

3. A sealing strip according to claim 1, in which
the material of the gripping means has at least one gripping lip running along at least one inside wall of the channel, and
the said part of the support member includes means located behind the gripping lip.

4. A sealing strip according to claim 1, in which the material of the gripping means is flexible plastics or rubber material having embedded within it a reinforcing carrier.

5. A sealing strip according to claim 1, in which the support member is made of rigid plastics material.

* * * * *